(12) United States Patent
Richardson

(10) Patent No.: US 9,743,796 B2
(45) Date of Patent: *Aug. 29, 2017

(54) PORTABLE COFFEE BREWING DEVICE

(71) Applicant: Brett C. Richardson, Clive, IA (US)

(72) Inventor: Brett C. Richardson, Clive, IA (US)

(*) Notice: Subject to any disclaimer, the term of this patent is extended or adjusted under 35 U.S.C. 154(b) by 104 days.

This patent is subject to a terminal disclaimer.

(21) Appl. No.: 14/585,317

(22) Filed: Dec. 30, 2014

(65) Prior Publication Data

US 2015/0182059 A1    Jul. 2, 2015

Related U.S. Application Data

(60) Provisional application No. 61/922,239, filed on Dec. 31, 2013.

(51) Int. Cl.

| A47J 31/00 | (2006.01) |
|---|---|
| A47J 31/06 | (2006.01) |
| A47J 31/46 | (2006.01) |
| A23F 5/26 | (2006.01) |
| A47J 31/52 | (2006.01) |
| A47J 31/057 | (2006.01) |

(52) U.S. Cl.
CPC ......... *A47J 31/005* (2013.01); *A47J 31/0576* (2013.01); *A47J 31/0626* (2013.01)

(58) Field of Classification Search
CPC ... A47J 31/005; A47J 31/0576; A47J 31/0626
USPC ........................................ 99/280, 302 R, 316
See application file for complete search history.

(56) References Cited

U.S. PATENT DOCUMENTS

| 1,774,927 A * | 9/1930 | Lambert | A47J 31/306 99/303 |
|---|---|---|---|
| 1,962,165 A * | 6/1934 | Wilcox | A47J 31/103 99/282 |
| 1,990,508 A * | 2/1935 | Wilcox | A47J 31/103 99/282 |
| 2,057,421 A * | 10/1936 | Dickson | A47J 37/041 126/41 B |
| 2,346,389 A * | 4/1944 | Peters | A47J 31/057 219/518 |
| RE22,879 E * | 5/1947 | Peters et al. | A47J 31/40 219/433 |
| 2,560,214 A * | 7/1951 | Cameron | A47J 31/20 219/445.1 |

(Continued)

*Primary Examiner* — Eric Stapleton
(74) *Attorney, Agent, or Firm* — Christopher A. Proskey; Brown Winick Law Office

(57) ABSTRACT

A portable coffee brewing device includes a lid pivotally connected to an upper end of the container by a hinge and button. A heating element housing and an electrical component housing is connected to a lower end of the container. A drain is positioned in a bottom wall of the container and is fluidly connected to a heating element positioned within the heating element housing. The heating element is controlled by electrical components positioned in the electrical components housing. A drip tube is fluidly connected to the heating element and the lid. A single serve coffee holding device is positioned below the lid. When the container is filled with fluid and the heating element is powered, heated fluid is forced up the drip tube through the passageway in the lid and into the coffee grounds holding device in a continuous cycle. The device is connectable to an external power source.

20 Claims, 6 Drawing Sheets

(56) References Cited

U.S. PATENT DOCUMENTS

| | | | | |
|---|---|---|---|---|
| 2,730,034 A * | 1/1956 | Svendsgaard | A47J 31/40 | 210/141 |
| 2,824,509 A * | 2/1958 | Trogden | A47J 31/0576 | 99/292 |
| 2,893,307 A * | 7/1959 | Latorre Rodriguez | A47J 37/041 | 126/275 E |
| 2,953,171 A * | 9/1960 | Arnett | G07F 13/065 | 141/174 |
| 3,083,450 A * | 4/1963 | Harvey | A47G 19/14 | 219/428 |
| 3,264,973 A * | 8/1966 | Tavera | A47J 31/053 | 99/295 |
| 3,374,897 A * | 3/1968 | Martin | A47J 31/446 | 210/455 |
| 3,467,816 A * | 9/1969 | Wahlberg | A47J 36/2461 | 219/202 |
| 3,473,463 A * | 10/1969 | McKnight | A47J 31/10 | 99/288 |
| 3,589,273 A * | 6/1971 | Karlen | A47J 31/057 | 99/307 |
| D241,402 S * | 9/1976 | Painter | A47J 31/446 | D7/400 |
| 4,149,454 A * | 4/1979 | Kemp | A47J 31/0621 | 210/481 |
| D256,079 S * | 7/1980 | Moncrief | A47J 31/446 | D7/400 |
| 4,309,940 A * | 1/1982 | Lowerre, Jr. | A47J 31/0573 | 99/281 |
| D266,894 S * | 11/1982 | Bersten | A47J 31/446 | D7/309 |
| 4,506,597 A * | 3/1985 | Karns | A47J 31/106 | 99/295 |
| D288,057 S * | 2/1987 | Webster | A47J 31/446 | D7/400 |
| 4,642,190 A * | 2/1987 | Zimmerman | B67C 11/02 | 210/464 |
| 4,674,400 A * | 6/1987 | Rondel | A47J 31/30 | 99/279 |
| 4,704,954 A * | 11/1987 | Mollenhoff | A47J 31/005 | 99/279 |
| 4,798,222 A * | 1/1989 | Kauffman | A47J 31/0605 | 137/132 |
| 5,233,914 A * | 8/1993 | English | A47J 31/005 | 99/282 |
| 5,440,972 A * | 8/1995 | English | A47J 31/005 | 99/282 |
| 5,644,972 A * | 7/1997 | Dahmen | A47J 31/467 | 426/433 |
| 5,694,115 A * | 12/1997 | Desatoff | A47J 31/44 | 307/140 |
| 5,927,179 A * | 7/1999 | Mordini | A47J 31/0615 | 99/304 |
| 6,250,208 B1 * | 6/2001 | Helps | A47J 31/0615 | 99/279 |
| 6,279,460 B1 * | 8/2001 | Pope | A47J 31/0615 | 426/433 |
| 6,571,686 B1 * | 6/2003 | Riley | A47J 31/0605 | 99/299 |
| 7,455,011 B2 * | 11/2008 | Brouwer | A47J 31/0678 | 426/433 |
| 7,458,316 B2 * | 12/2008 | Scelza | A47J 31/005 | 126/609 |
| 7,980,422 B2 * | 7/2011 | Lassota | A47J 31/50 | 222/146.2 |
| 8,225,708 B2 * | 7/2012 | Lassota | A47J 31/56 | 219/477 |
| 8,286,547 B1 * | 10/2012 | Lassota | A47J 31/20 | 99/280 |
| 8,397,628 B2 * | 3/2013 | Webster | A47J 31/0605 | 99/299 |
| 8,467,670 B2 * | 6/2013 | Baston | A47J 31/005 | 392/444 |
| 9,271,605 B2 * | 3/2016 | Boussemart | A47J 27/21 | |
| 2004/0025702 A1 * | 2/2004 | Cutter | A47J 31/54 | 99/279 |
| 2005/0199130 A1 * | 9/2005 | Palese | A47J 31/005 | 99/279 |
| 2005/0252382 A1 * | 11/2005 | Gamez Duch | A47J 31/005 | 99/279 |
| 2005/0284303 A1 * | 12/2005 | Zell | A47J 31/005 | 99/279 |
| 2007/0137495 A1 * | 6/2007 | Talbert | A47J 31/20 | 99/286 |
| 2007/0221067 A1 * | 9/2007 | Scelza | A47J 31/005 | 99/279 |
| 2008/0302252 A1 * | 12/2008 | O'Brien | A47J 31/32 | 99/302 R |
| 2009/0285570 A1 * | 11/2009 | Yeh | A47J 27/21033 | 392/501 |
| 2010/0199852 A1 * | 8/2010 | Webster | A47J 31/0605 | 99/306 |
| 2010/0282089 A1 * | 11/2010 | Boussemart | A47J 27/21 | 99/281 |
| 2011/0103779 A1 * | 5/2011 | Baston | A47J 31/005 | 392/444 |
| 2013/0186280 A1 * | 7/2013 | Sekiguchi | A47J 31/005 | 99/287 |
| 2013/0200063 A1 * | 8/2013 | Cooke | A47J 41/0044 | 219/439 |
| 2013/0312617 A1 * | 11/2013 | Toporovsky | A47J 31/005 | 99/280 |
| 2014/0072684 A1 * | 3/2014 | Madden | A47J 31/005 | 426/431 |
| 2015/0282665 A1 * | 10/2015 | Boussemart | A47J 27/21 | 99/281 |

* cited by examiner

PORTABLE COFFEE BREWING DEVICE

CROSS REFERENCE TO RELATED APPLICATION

This application claims the benefit of U.S. Provisional Application No. 61/922,239 filed Dec. 31, 2013.

BACKGROUND OF THE INVENTION

This invention relates to coffee brewing. More specifically, and without limitation, this invention relates to a portable coffee brewing device.

Coffee brewing is old and well known in the art. Initially, coffee was brewed by mixing ground coffee beans with water in a pot or other vessel which was placed over a source of heat. As the water warmed, the ground beans released flavors into the water, thereby forming what is known as coffee. Once this process was completed, the coffee grounds were separated from the coffee and the coffee was consumed.

With the advent and mass adoption of electricity, the technology of coffee brewing took a major leap forward. With the use of electricity, countless forms and designs of coffee machines or coffee makers (hereinafter "coffee makers") were developed. Manufacturers of these coffee makers include Cuisinart, Mr. Coffee, Hamilton Beach, Kitchen Aid, Bunn and countless others. Conventionally these devices include a base, an internal heating element which is connected to a source of electricity, a reservoir for holding water, a pot to receive the coffee and a coffee grounds holding device to hold the coffee grounds. Typically, these devices are designed to sit on a counter top and be used in a kitchen in a stationary and non-portable manner. As such, these conventional coffee makers are often bulky and are formed of multiple pieces and therefore these devices are not easily portable.

Understanding that conventional coffee makers are generally non-portable, yet many coffee drinkers like to take their coffee with them in the morning to work or to run errands, some manufacturers developed what are commonly known as personal coffee makers. These personal coffee makers are designed to make a single serving of coffee that can be poured into a to-go cup or travel mug. Some of these personal coffee makers are even designed to pour directly into the cup or travel mug, thereby avoiding the additional step of having to pour the coffee from the pot into the cup or travel mug. While these personal coffee makers have made it somewhat easier for someone to take coffee with them on the go, these personal coffee makers themselves are no more portable than conventional coffee makers.

Therefore, for the reasons stated above, and for other reasons stated below, which will become apparent to those skilled in the art upon reading and understanding the specification, and the drawings, there is a need in the art for a portable coffee brewing device.

Thus, it is a primary object of the invention to provide a portable coffee brewing device that improves upon the state of the art.

Another object of the invention to provide a portable coffee brewing device that is easy to use.

Yet another object of the invention to provide a portable coffee brewing device that brews a pleasing and high quality cup of coffee.

Another object of the invention to provide a portable coffee brewing device that is inexpensive to manufacture.

Yet another object of the invention to provide a portable coffee brewing device that has an intuitive design.

Another object of the invention to provide a portable coffee brewing device that has a robust and durable design.

Yet another object of the invention to provide a portable coffee brewing device that has a long and useful life.

Another object of the invention to provide a portable coffee brewing device that has a simple and ergonomic design.

Yet another object of the invention to provide a portable coffee brewing device that allows a user to make a fresh cup of coffee whenever and wherever they so desire.

Another object of the invention to provide a portable coffee brewing device that allows a user to load the device with water and coffee grounds at one time and one place while allowing for brewing of the coffee at another time and another place.

Another object of the invention to provide a portable coffee brewing device that uses what are known as K-cups.

Yet another object of the invention to provide a portable coffee brewing device that has an appealing design.

Another object of the invention to provide a portable coffee brewing device that is safe to use.

Yet another object of the invention to provide a portable coffee brewing device that is easy to clean.

Another object of the invention to provide a portable coffee brewing device that does not leak.

Yet another object of the invention to provide a portable coffee brewing device that uses disposable coffee grounds holding devices.

These and other objects, features, or advantages of the invention will become apparent from the specification, drawings and claims.

BRIEF SUMMARY OF THE INVENTION

A portable coffee brewing device includes a lid pivotally connected to an upper end of the container by a hinge and button. A heating element housing and an electrical component housing is connected to a lower end of the container. A drain is positioned in a bottom wall of the container and is fluidly connected to a heating element positioned within the heating element housing. The heating element is controlled by electrical components positioned in the electrical components housing. A drip tube is fluidly connected to the heating element and the lid. A single serve coffee holding device is positioned below the lid. When the container is filled with fluid and the heating element is powered, heated fluid is forced up the drip tube through the passageway in the lid and into the coffee grounds holding device in a continuous cycle. The device is connectable to an external power source.

DETAILED DESCRIPTION OF THE PREFERRED EMBODIMENTS

Figure 1:
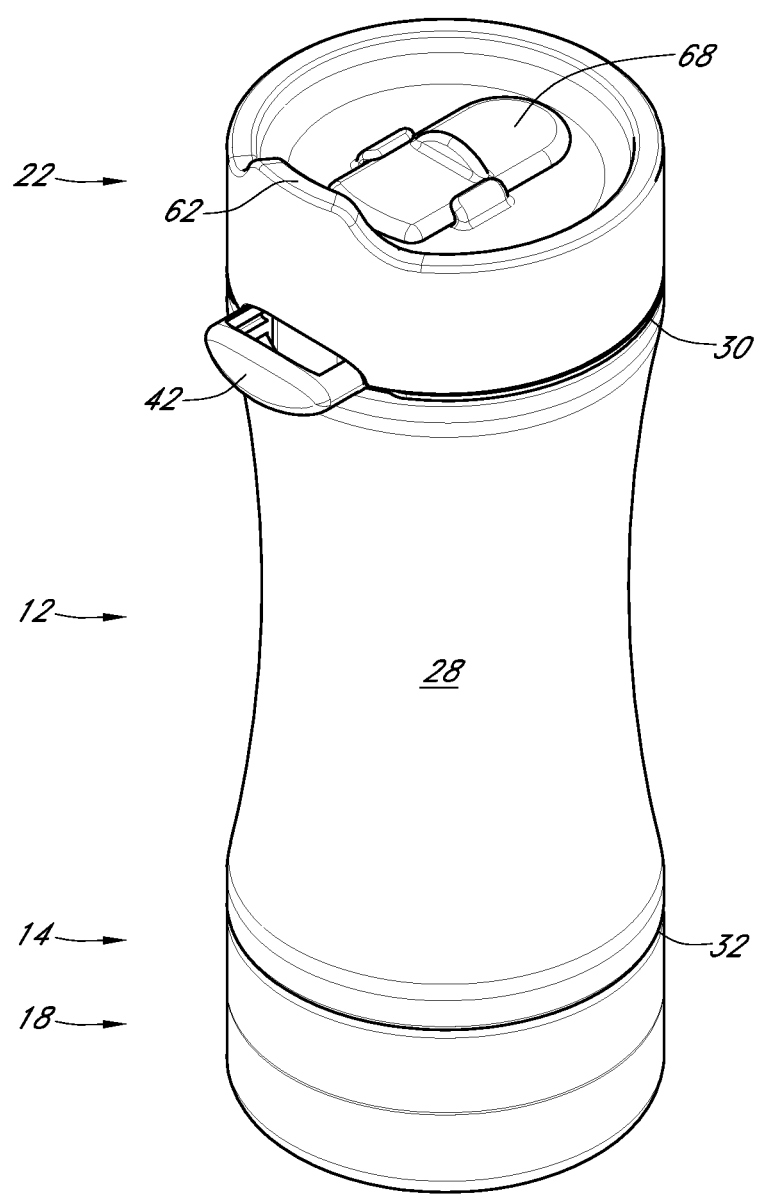
FIG. 1 is a perspective view of a portable coffee brewing device with the lid in a closed position.
Figure 2:
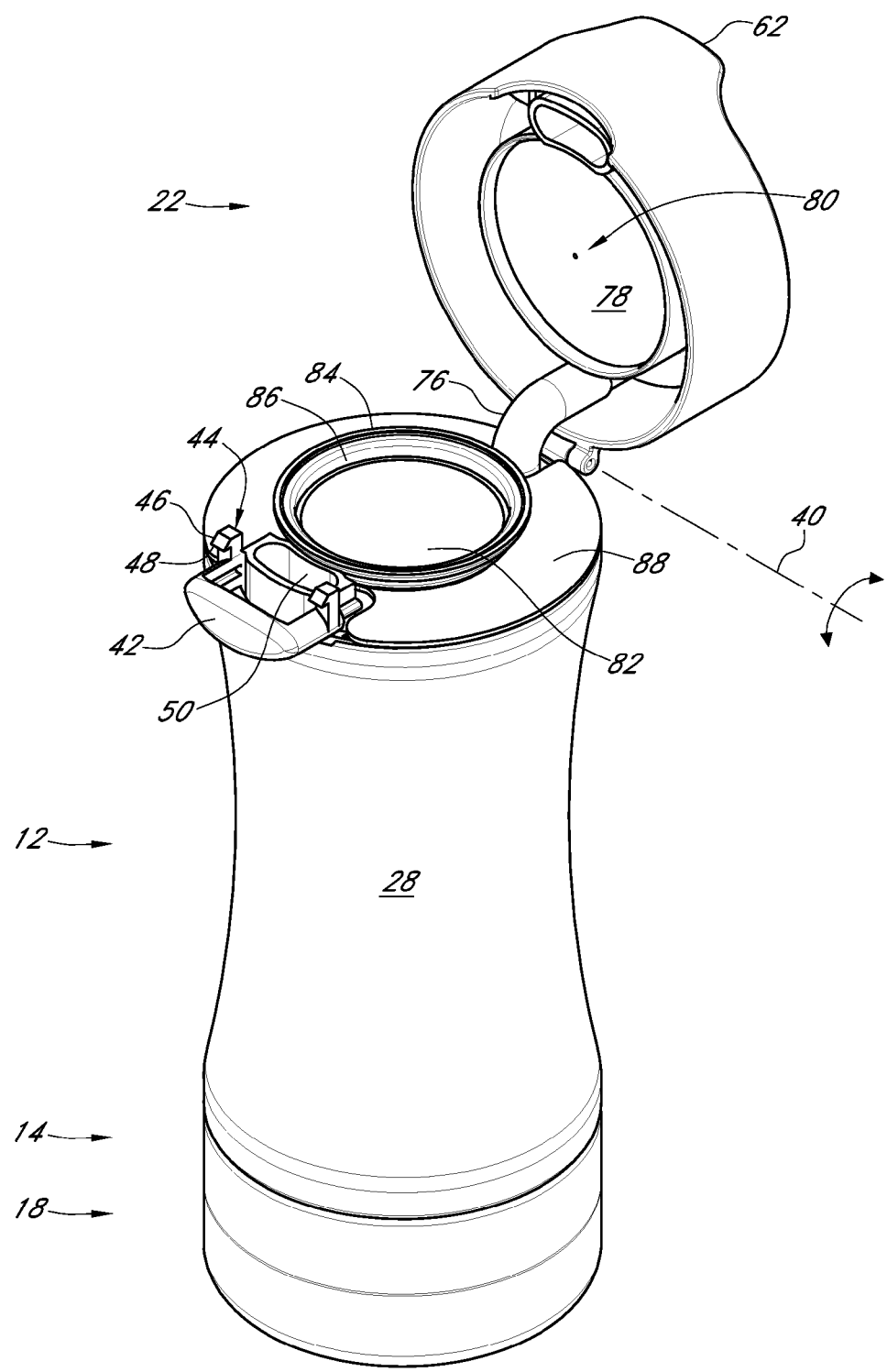
FIG. 2 is a perspective view of a portable coffee brewing device with the lid in an open position showing the K-cup holder or insert.
Figure 3:
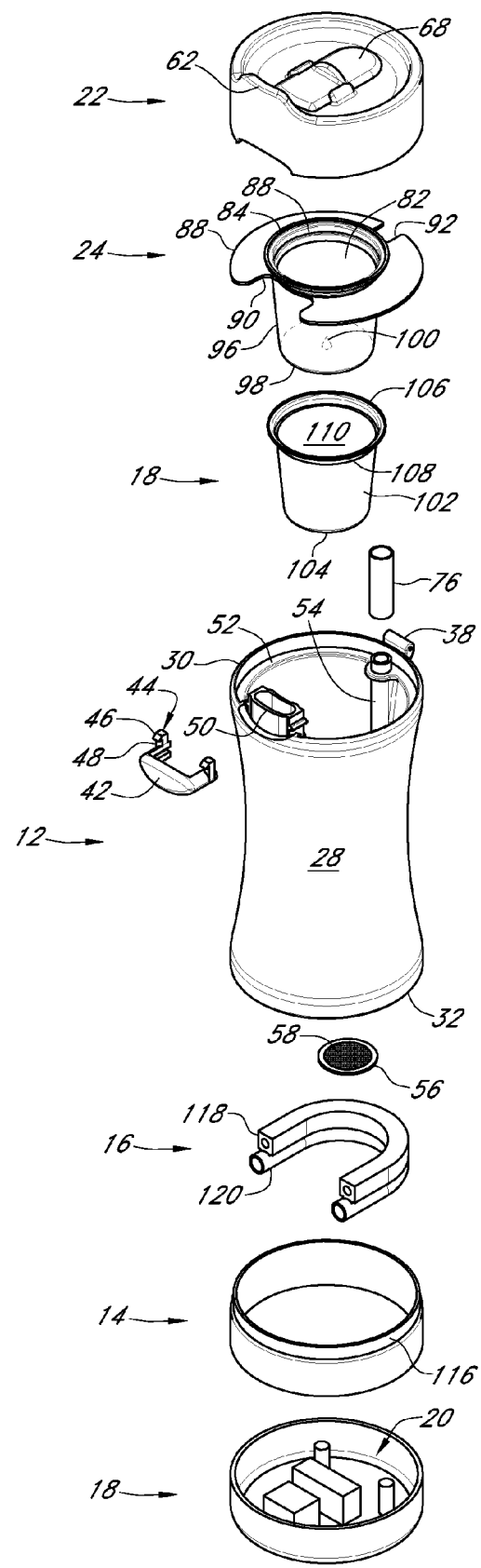
FIG. 3 is a perspective exploded view of a portable coffee brewing device showing the components thereof.
Figure 4:
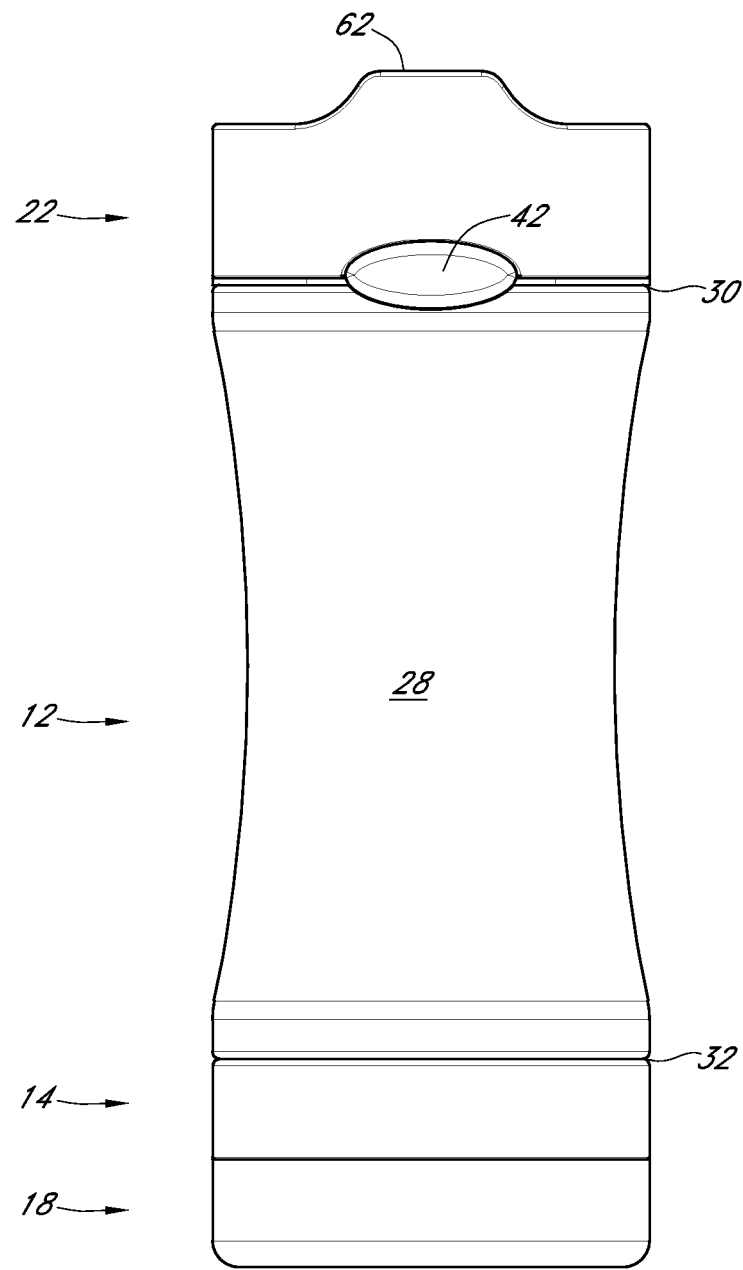
FIG. 4 is a front elevation view of a portable coffee brewing device.
Figure 5:
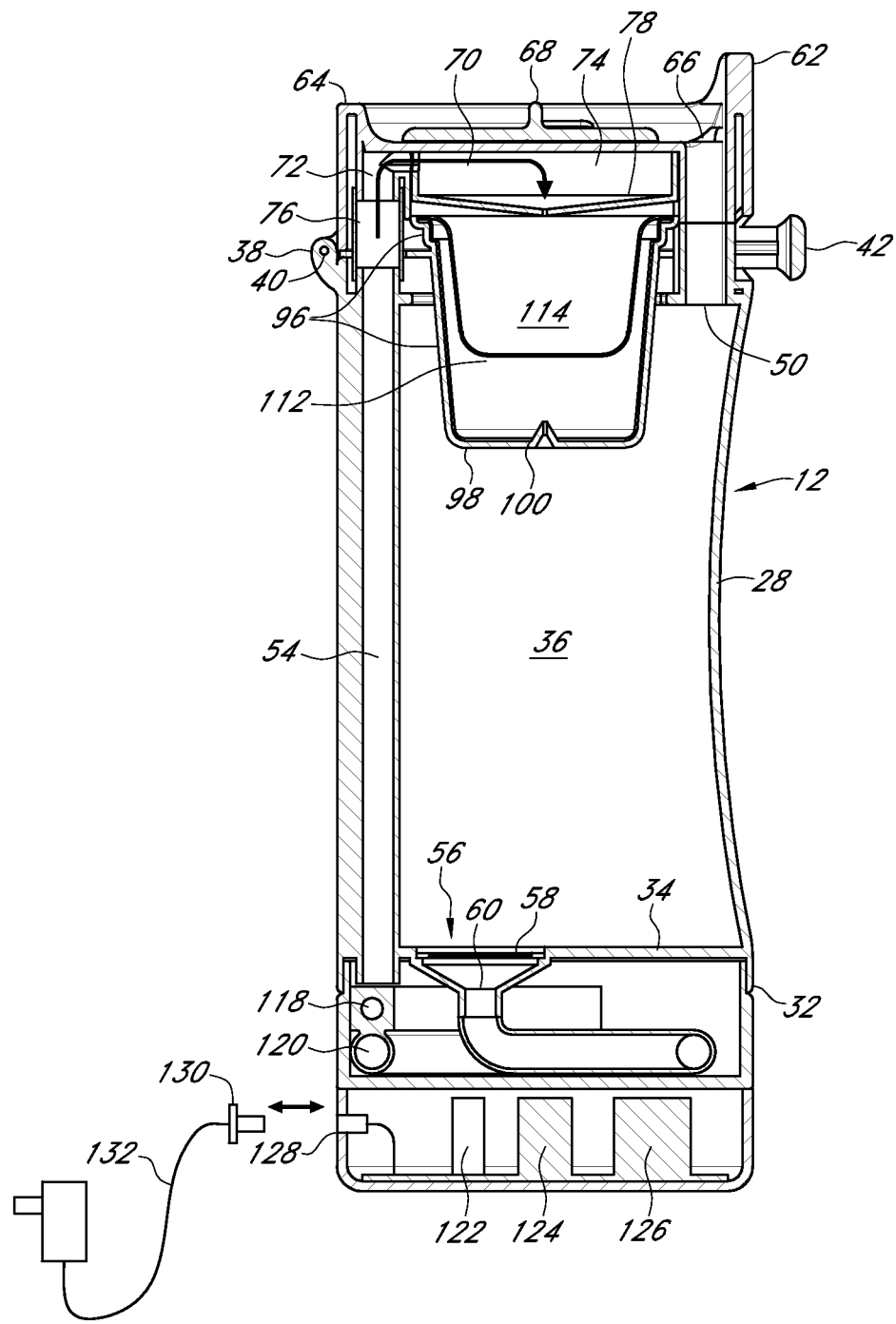
FIG. 5 is a side cut-away elevation view of a portable coffee brewing device.
Figure 6:
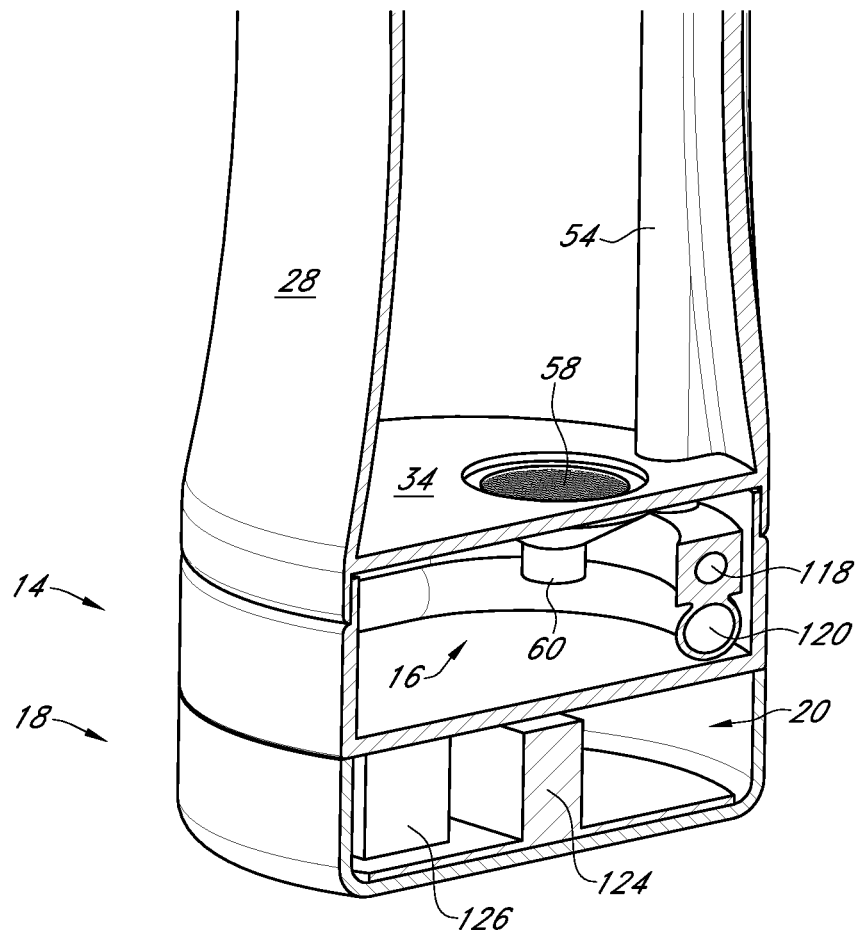
FIG. 6 is a side cut-away close-up perspective view of the bottom of a portable coffee brewing device.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the inventions. The following detailed description is, therefore, not to be taken in a limiting sense, and the scope of the present invention is defined only by the appended claims, along with the full scope of equivalents to which such claims are entitled.

As used herein, the terminology such as vertical, horizontal, top, bottom, front, back, end and sides are referenced according to the views presented and with respect to the orientation of related parts and pieces as is described herein. It should be understood, however, that the terms are used only for purposes of description, and are not intended to be used as limitations. Accordingly, orientation of an object or a combination of objects may change without departing from the scope of the invention.

A portable coffee brewing system 10 is presented in the figures. The system 10 includes a container 12, a heating element housing 14 that holds a heating element 16, an electrical components housing 18 that holds electrical components 20, a lid 22, a holder or insert 24, and a coffee grounds holding device 26.

Container:

Container 12 is formed of any suitable size, shape and design and is any form of a liquid holding vessel such as a cup, a mug, a travel mug, a thermal mug, or the like. In one arrangement, as is shown, container 12 includes a sidewall 28 that extends in a generally circular manner from an upper end 30 to a lower end 32.

Sidewall 28 connects at or near its lower end 32 to bottom wall 34 that defines the bottom of the hollow interior 36 formed by container 12. Sidewall 14 terminates in an open upper end to which lid 22 is connected.

In one arrangement, sidewall 14 includes connecting features, such as threads, snap-fit-features, grooves or the like, adjacent either the interior surface or exterior surface of the open upper end 30 of sidewall 28. These connecting features are used for connecting lid 22 to container 12 in a manner that allows lid 20 to be opened if not removed entirely.

In one arrangement, as is shown, lid 20 connects to container 12 by hinge 38. In the arrangement shown, hinge 38 is positioned in the rearward upper end of sidewall 28. Lid 22 pivots upon hinge 38 between an open position and a closed position around axis 40 that extends through the center of hinge 38.

In one arrangement, as is shown, a button 42 is positioned at or near the upper end 30 of sidewall 28, on the opposite side of container from opposite hinge 38. Button 42 is formed of any suitable size, shape and design and is used to hold lid 20 in a closed position as well as release lid 20 to an open position. Button 42 slides laterally a distance toward and away from the center of container 12 and is urged forward by a biasing member (not shown) such as a spring, compressible piece of material or a flexible member, so as to hold lid 22 in a closed position.

In the arrangement shown, button 42 includes a pair of latching arms 44, one on either side of button 42, the latching arms 44 each having a rounded or angled upper surface 46 that connects to a generally flat bottom surface 48 or locking surface. These latching arms 44 engage and connect to mating features in the underside of lid 22.

As the lid 22 is lowered, the bottom surface of lid 22 engages the rounded or angled surfaces 46 of latching arms 44 which causes the button 42 to move rearward against the force of biasing member and towards the center of container 12. This movement continues until the rounded or angled surface 46 of latching arms 44 pass the mating feature of lid 22, at which point the biasing member forces the button 42 forward as the flat or locking surfaces 48 of latching arms 44 engage and hold onto the lid 22 thereby locking the lid 22 in a closed position.

Button 42 is positioned in front of and/or around a pour spout 50 connected to container 12. Pour spout 50 is formed of any suitable size, shape and design. In the arrangement shown, as one example, pour spout 50 is connected to the interior surface of sidewall 28 adjacent its upper end 30 opposite hinge 38. Pour spout 50 provides fluid communication from the hollow interior 36 of container 12 to lid 22.

Container 12 includes a lip 52. Lip 52 is formed of any suitable size, shape and design. In one arrangement, as is shown, lip 52 extends around the interior surface of sidewall 28 and extends inward therefrom a distance. Lip 52 is recessed a distance below the upper end 30 of sidewall 28.

Container 12 also includes a drip tube 54. Drip tube 54 is formed of any suitable size, shape and design. In one arrangement, as is shown, drip tube 54 is a generally circular tube that extends from below the bottom wall 34 to at or near the upper end 30 of sidewall 28. In one arrangement, drip tube 54 is connected to, positioned within sidewall 28 of container 12. In this arrangement, where drip tube 54 is a separate piece from container 12, drip tube 54 is removable so as to allow cleaning or replacement of drip tube 54. Alternatively, drip tube 54 is formed on or in sidewall 28 as part of sidewall 28.

The lower end of drip tube 54 fluidly connects to heating element 16, either directly or by way of connection to one or more other components. The upper end of drip tube 54 fluidly connects to lid 22, either directly or by way of connection to one or more other components. In this way, drip tube 54 provides a fluid conduit from below bottom wall 34 to lid 22.

Container 12 also includes a drain 56. Drain 56 is formed of any suitable size, shape and design. In one arrangement, as is shown, drain 56 is positioned within bottom wall 34 and provides a fluid passageway from the hollow interior 36 of container 12 to the heating element 16. In one arrangement, the drain 56 is centrally positioned in the bottom wall 34 so as to allow the heating element container 14 to be screwed onto the lower end 32 of container 12 in a removable and replaceable fashion. Alternatively, as in the arrangement shown, drain 56 is positioned in an off-center arrangement.

Drain 56 includes a filter or screen 58 that covers the drain 56 and prevents particles, such as coffee grinds, from entering drain 56 and plugging it. Drain 56 also includes a valve or check valve 60. Check valve 60 allows for fluid to flow through valve 60 in one direction, but prevents fluid flow in an opposite direction. In this application, check valve 60 allows fluid to flow from hollow interior 36 to heating element 16, but prevents flow in the opposite direction. In this way, as the fluid is boiled by the heating element 16, the fluid is forced up the drip tube 54, through lid 22 and back into the hollow interior 36 thereby causing continuous circulation of fluid.

Lid:

Lid 22 is formed of any suitable size, shape and design. Lid 22 connects to the upper end 30 of container 12. In one arrangement, as is shown, lid 22 is generally circular in shape when viewed from above and matingly engages the upper end 30 of container 12.

The rearward side of lid 22 connects to hinge 38 and the forward side of lid 22 connects to button 42. In this way, lid 22 is locked in a closed position by button 42, while releasing button 42 allows lid 22 to be opened upon hinge 38 thereby providing access to the hollow interior 36 of container 12.

The forward end of lid 22 includes a lip 62 that protrudes above the upper edge 64 of lid 22. Lid 22 includes a pour spout 66 that is positioned just rearward of lip 62. Pour spout 66 of lid 22 fluidly connects with pour spout 50 of container 12 when lid 22 is in a closed position.

Pour spout 66 of lid 22 is selectively opened and closed by cover 68. Cover 68 is any device that opens and closes pour spout 66. In the arrangement shown, as one example, cover 68 slides forward, to cover and close pour spout 66, and slides rearward to uncover pour spout 66, however any other form of a cover is hereby contemplated for use.

Lid 22 includes a passageway 70 therein (which is depicted by arrow 70). Passageway 70 is formed of any suitable size, shape and design and provides a fluid conduit from drip tube 54 to holder or insert 24 and/or coffee grounds holding device 26.

In one arrangement, as is shown, passageway 70 includes a vertical portion 72 that is positioned at the rearward side of lid 22 and fluidly communicates with drip tube 54, and a horizontal portion 74 that extends toward the center of lid 22 and fluidly communicates with holder or insert 24 and/or coffee grounds holding device 26.

In one arrangement, vertical portion 72 of passageway 70 connects to a flexible tube portion 76. Flexible tube portion 76 connects the upper end of drip tube 54 to the lower end of vertical portion 70 of passageway 70. As flexible tube portion 76 is flexible, it allows for opening and closing of lid 22 while keeping passageway 70 and drip tube 54 in fluid sealed communication.

In an alternative arrangement, vertical portion 72 and the upper end of drip tube 54 connect and seal to one another when lid 22 is in a closed position, whereas when lid 22 is in an open position vertical portion 72 and the upper end of drip tube 54 separate from one another. In this arrangement, to ensure proper sealing any form of a connection can be used. As examples, a compressible seal is positioned between the vertical portion 72 and the upper end of drip tube 54, the vertical portion 72 and the upper end of drip tube 54 are formed in mating overlapping condition when closed, or any other arrangement.

In one arrangement, as is shown, horizontal portion 74 is generally circular in shape and includes a sloped bottom wall 78 that angles downward as it extends toward the center of lid 22. This sloped bottom wall 78 includes at least one nipple 80 having an opening therein. Nipple 80 extends downward from the sloped bottom wall 78 such that when lid 22 is closed, nipple 80 punctures the coffee grounds holding device 26 thereby providing an opening and access for fluid into the coffee grounds holding device 26. As the bottom wall 78 is sloped downward, as the horizontal portion 74 fills with fluid, the force of gravity moves the fluid along the sloped bottom wall 78 into the coffee grounds holding device 26.

Holder or Insert:

Holder or insert 24 is formed of any suitable size, shape and design. In one arrangement, as is shown, holder or insert 24 is sized and shaped to be positioned between container 12 and lid 22 and held in place there between when lid 22 is in a closed position. Holder or insert 24 includes a generally circular opening 82 positioned at its middle that is defined by a collar 84 that extends around the opening 82. Collar 84 includes at least one step 86 therein that is narrower than the collar 84. This step 86 is sized and shaped to matingly receive and hold a similar step in coffee grounds holding device 26 so as to prevent coffee grounds holding device 26 from falling through holder or insert 24.

A flange 88 extends outward from collar 84 in a generally flat and planar manner. Flange 88 is sized and shaped to fit just within the interior surface of sidewall 28 and sit on top of lip 52 adjacent the upper end 30 of container 12. Flange 88 includes a forward notch 90 therein that is sized and shaped to fit around the pour spout 66 of container 12. Flange 88 also includes a rearward notch 92 therein that is sized and shaped to fit around the area wherein drip tube 54 connects with passageway 70 of lid 22.

A frame member 96 connects to and extends downward from collar 84. Frame member 96 extends downward from collar 84 and connects to a bottom wall 98 having a nipple 100 with an opening therein. Nipple 100 extends upward from bottom wall 98. Frame member 96 and bottom wall 98 are sized and shaped to receive coffee grounds holding device 26 therein with close and tight clearance therein. Frame member 96 and bottom wall 98 may be skeletonized in shape, or they can be formed of a solid continuous wall.

When coffee grounds holding device 26 is placed in holder or insert 24 and lid 22 is closed, nipple 100 penetrates the bottom wall of coffee grounds holding device 26 thereby providing an exit for fluid flowing into the coffee grounds holding device 26.

Coffee Grounds Holding Device:

Coffee grounds holding device 26 is formed of any suitable size, shape and design. In one arrangement, as is shown, coffee grounds holding device 26 is formed of what is commonly known as a "K-cup" which was designed and originally manufactured and distributed under the name Keurig which is part of Keurig Green Mountain, Inc. which has its headquarters in Waterbury, Vt. These coffee grounds holding devices 26 are single use, single serve and are formed of a plastic container that is generally circular sidewall 102 in shape and narrows as it extends downward before terminating in a bottom wall 104. The coffee grounds holding device 26 includes a flange 106 connected to the upper end of sidewall 102 and extends outward therefrom, as well as one or more steps 108 positioned between the flange 106 and the sidewall 102.

The hollow interior formed by the coffee grounds holding device 26 is enclosed by a foil cover 110. A filter member 112 is positioned within the hollow interior of the coffee grounds holding device 26 and holds an amount of coffee grounds 114 therein. The filter member 112 allows for the passage of fluids there through while preventing the passage of coffee grounds 114. This arrangement allows for quick and easy insertion and removal of a coffee grounds holding device 26 into holder or insert 24 when the lid 22 is in an open positions.

Heating Element Housing:

Heating element housing 14 is formed of any suitable size, shape and design. In one arrangement, as is shown, heating element housing 14 is generally circular in shape or disc shaped and connects to the lower end 32 of container 12. Heating element housing 14 connects to container 12 by any manner or means. In one arrangement, heating element housing 14 is permanently connected to and sealed to the bottom of container 12, such as by use of welding, adhesive, friction fit, locking engagement, or any other method or means. In an alternative arrangement, heating element housing 14 is connected to the bottom of container 12 by any removable manner or means such as threaded engagement, snap fit, friction fit or any other method or means. By being removable, this allows the components of heating element housing 14 to be accessed and cleaned. By being permanently affixed, this ensures that heating element housing 14 is permanently and properly sealed ensuring that water does not infiltrate the hollow interior of heating element housing 14. In one arrangement, as is shown, the upper end of heating element housing 14 has a step 116 that is matingly received by, and fits just within, the interior surface of the lower end 32 of container 12, just below bottom wall 34.

Heating element housing 14 holds heating element 16. Heating element 16 is formed of any device which receives and heats fluids in container 12. In one arrangement, as is shown, heating element 16 is formed of an electrical conduit 118 that is connected to heating tube 120.

Electrical conduit 118 and heating tube 120 are formed of any suitable size, shape and design. In the arrangement shown, electrical conduit 118 and heating tube 120 are formed in a U-shape, however any other shape is hereby contemplated, such as a coil, spiral, zig-zag, or any other shape.

In the arrangement shown, electrical conduit 118 includes an opening through its middle that receives an electrical filament that when powered generates heat. Heating tube 120 is in direct physical contact to electrical conduit 118 throughout all or the majority of its length so that heat generated by electrical conduit 118 is efficiently absorbed or transmitted to heating tube 120, which is a hollow tube.

The entry end of heating tube 120 is fluidly connected to drain 56 so as to receive fluid from container 12. The exit end of heating tube 120 is fluidly connected to the lower end of drip tube 54. Due to the one-way check valve 60 in drain 56, heating tube 120 receives fluid from container 12, as the fluid is heated by electrical conduit 118 the fluid boils and expands. The expanding fluid cannot move against the check valve 60 and therefore it is forced up the drip tube 54.

In one arrangement, heating element housing 14 is insulated so as to sealing the heat generated from electrical conduit 118 and to prevent heat from transferring to other portions of the device 10.

Electrical Components Housing:

Electrical components housing 18 is formed of any suitable size, shape and design. In one arrangement, as is shown, electrical components housing 18 is generally circular in shape or disc shaped and connects to the lower end of heating element housing 14 and thereby forms the bottom of portable coffee brewing device 10. Electrical components housing 18 connects to container 12/heating element housing 14 by any manner or means. In one arrangement, electrical components housing 18 is permanently connected to and sealed to the bottom of container 12/heating element housing 14, such as by use of welding, adhesive, friction fit, locking engagement, or any other method or means. In an alternative arrangement, electrical components housing 18 is connected to the bottom of container 12/heating element housing 14 by any removable manner or means such as threaded engagement, snap fit, friction fit or any other method or means. By being removable, this allows the components of electrical components housing 18 to be accessed and cleaned. By being permanently affixed, this ensures that electrical components housing 18 is permanently and properly sealed ensuring that water does not infiltrate the hollow interior of electrical components housing 18.

Electrical components housing 18 holds electrical components 20. Electrical components 20 are formed of any electrical components needed to turn on, turn off and control the portable coffee brewing device 10. These electrical components 20 are electrically connected to electrical conduit 118 and thereby powers on and powers off electrical conduit 118.

In one arrangement, as is shown, electrical components 20 include a switch 122 which controls the flow of energy to the electrical conduit 118.

In one arrangement, as is shown, electrical components 20 also include a sensor 124 which senses the temperature of the fluids within the container 12 and/or the temperature of the electrical conduit 118 and/or the temperature of the heating tube 120.

In one arrangement, as is shown, electrical components 20 also include a microprocessor 126 which receives information from the other electrical components 20 and processes this information based on instructions stored in memory and outputs results. In one arrangement, microprocessor 126 includes a clock or clock function which controls the amount of time the amount of time or duration that the electrical conduit 118 is powered.

In one arrangement the sensor 124 turns on and turns off the power to electrical conduit 118 based upon the sensed temperature, in another arrangement, the sensor 124 transmits the sensed temperature to the microprocessor 126 which controls the turning on and turning off of the power to the electrical conduit 118.

In one arrangement, the check valve 60 is mechanical in nature, whereas in another arrangement microprocessor 126 controls the operation of check valve 60. In this arrangement, the microprocessor 126 is programmed to close the check valve 60 a period of time before cutting power to the electrical conduit 118. This allows the remaining amount of fluid in the heating tube 120 to be boiled and transmitted up the drip tube 54 so as clearing the drip tube 54 and heating tube 120 before turning off the system 10. This prevents fluid from being stuck in the heating tube 120 between uses.

Electrical components housing 18 includes any other electrical components needed to operate portable coffee brewing system 10.

In an alternative arrangement, electrical components housing 18 and heating element housing 14 are combined into a single housing.

Socket & Plug:

A socket 128 is connected to the portable coffee brewing system 10. Socket 128 is formed of any suitable size, shape and design and serves to connect portable coffee brewing device 10 to an external power source. Any form of a socket 128 that connects two components together and allows for electrical transmission there between is hereby contemplated for use, these include a two wire socket, a three wire socket, a headphones jack, a USB socket, or any other form of socket. Socket 128 is sized and shaped to matingly receive plug 130 in a removable manner. Plug 130 is connected to a power lead 132 which is designed to be connected to an external power source, such as a wall-plug-in, a USB port, a cigarette lighter socket in a vehicle, or any other source of power.

In Operation:

A user desiring to use the portable coffee brewing system 10 fills opens the lid 22 by pressing button 42. This allows lid 22 to be pivotally opened on hinge 38. This exposes the holder or insert 24. If no coffee grounds holding device 26 is present, the user can simply pour the desired amount of water into the container 12 through the opening in the center of the holder or insert 24. If a coffee grounds holding device 26 is present, the user can remove coffee grounds holding device 26 or the holder or insert 24 entirely which will expose the open upper end of container 12 allowing the user to fill it with the desired amount of fluid.

Once container 12 is filled with fluid, the user replaces the holder or insert 24 by aligning the forward notch 90 with the pour spout 66 and the rearward notch 92 with the drip tube 54 and allows the holder or insert 24 to sit upon lip 52. Once the holder or insert 24 is this fully installed position, the user selects their desired coffee ground holding device 26 (also known as a K-cup) and places the coffee ground holding device 26 within the opening 82 until it settles there within and the flange 106 and steps 108 of coffee ground holding device 26 engages the collar 84 and steps 86 of holder or insert 24.

With the container 12 filled with water, and the coffee ground holding device 26 installed in the installed holder or insert 24, the user next closes the lid 22. As the lid is closed, the rounded or angled upper surface 46 of latching arms 44 engage the underside of lid 22 as it is forced downward toward container 12. As the lid 22 moves downward, the rounded or angled upper surfaces 46 of latching arms 44 force the button 42 rearward against the biasing force of biasing member until the bottom surface or locking surface 48 of latching arms 44 grab hold of the lid 22. In this position, the lid 22 is fully closed and the seam line between the upper end 30 of container 12 is fully sealed with the lower end of lid 22 in a watertight manner. In one arrangement, a compressible member, such as a plastic or rubber or composite O-ring is placed at the intersection of the container 12 and lid 22 to ensure proper sealing.

As the lid 22 is closed, this forces nipple 80 in the bottom surface of lid 22/sloped bottom wall 78 to penetrate the cover 110 of the coffee grounds holding device 26 thereby providing a fluid passageway into the coffee grounds holding device 26. Similarly, as the lid 22 is closed, this forces nipple 100 in the bottom wall 98 of holder or insert 24 to penetrate the bottom wall 104 of the coffee grounds holding device 26 thereby providing a fluid passageway out of the coffee grounds holding device 26 and into container 12.

In this condition, the portable coffee brewing device 10 is both portable as well as ready to brew a fresh cup of coffee.

When the user arrives at their location, such as at their office, they plug power lead 132 into an external power source and then they insert plug 132 into socket 128 which powers the device. In the arrangement wherein the check valve 60 is powered, the microprocessor 126 opens the powered check valve 60 which allows fluid to pass through drain 56 and into heating tube 120. Alternatively, wherein the check valve 60 is unpowered, fluid is allowed to move through drain 56 and into heating tube 12, but not the opposite direction.

Simultaneously, power is transmitted to the electrical conduit 118 which generates heat. This heat is transmitted to heating tube 120 and fluid within the heating tube 120, which is allowed through check valve 60 is heated. As the fluid is heated, its volume expands and fluid is forced through the only escape it has, and that is through the drip tube 54 (because it cannot move against or in the opposite direction of the check valve 60.

The heated fluid travels up the drip tube 54, through the flexible tube portion 76 and into the passageway 70 in lid 22. That is the fluid first moves through the vertical portion 72 of the passageway 70 before entering the horizontal portion 74 of the passageway 70. From there, the force of gravity, as well as the hydrodynamic forces of the expanding fluid coming up the drip tube 54, forces the heated fluid to drain down the sloped bottom wall 78 of the passageway 70, through the opening in nipple 80 and into coffee grounds holding device 26.

Once the heated fluid is in the coffee grounds holding device 26, the heated fluid drains through the coffee grounds 114, through the filter member 112 and out of the hole in the bottom wall 104 of coffee grounds holding device 26 formed by nipple 100. As the heated fluid, which is now coffee, passes through nipple 100 the heated fluid enters the again container 12 and the process is repeated in a continuous flow, similar to the process of what is known as a percolator.

Throughout the process, the sensor 124 and microprocessor 126 track the system. The sensor 124 and/or the microprocessor 126 will turn on or turn off the power to the electrical conduit 118 when the temperature exceeds a maximum predetermined temperature, or when the predetermined amount of time for brewing has been exceeded.

When the coffee is fully brewed, the user unplugs the power lead 132 and slides the cover 68 rearward thereby exposing the pour spout 66 which allows the user to drink directly from the container 12.

To remove and replace the coffee grounds holding device 26 the lid 22 is again opened and the coffee grounds holding device 26 is replaced.

From the above discussion, it will be appreciated that portable coffee brewing device presented improves upon the state of the art. That is, the portable coffee brewing device shown and described herein: is easy to use; brews a pleasing and high quality cup of coffee; is inexpensive to manufacture; has an intuitive design; has a robust and durable design; has a long and useful life; has a simple and ergonomic design; allows a user to make a fresh cup of coffee whenever and wherever they so desire; allows a user to load the device with water and coffee grounds at one time and one place while allowing for brewing of the coffee at another time and another place; uses what are known as K-cups; has an appealing design; is safe to use; is easy to clean; and does not leak; among countless other features and advantages.

Note that reference to coffee brewing herein is only by way of example. It is hereby contemplated that the system 10 can be used to brew any hot beverage such as tea, apple cider, hot chocolate, or the like and is not limited to coffee.

It will be appreciated by those skilled in the art that other various modifications could be made to the device without parting from the spirit and scope of this invention. All such modifications and changes fall within the scope of the claims and are intended to be covered thereby.

What is claimed:

1. A portable coffee brewing device comprising:
   a container;
   the container having a sidewall that extends from an upper end to a lower end;
   a bottom wall connected to the lower end of the sidewall thereby defining a hollow interior of the container;
   a lid;
   the lid connected to the upper end of the container;

a nipple operatively connected to the lid;
the lid configured to move between an open position and a closed position;
a coffee grounds holding device positioned adjacent the lid;
wherein the coffee grounds holding device includes a container that forms a hollow interior, an amount of coffee grounds held within the hollow interior of the coffee grounds holding device, and a cover that covers the hollow interior of the coffee grounds holding device;
a housing;
the housing connected to the lower end of the container;
a heating element positioned within the housing;
electrical components positioned within the electrical components housing;
the heating element electrically connected to the electrical components;
a drip tube;
the drip tube fluidly connected to the lid;
wherein when the container is filled with fluid and the heating element is powered, heated fluid is forced up the drip tube into the lid and into the coffee grounds holding device in a continuous cycle thereby brewing coffee;
wherein when the lid is moved from an open position to a closed position, the nipple penetrates the cover of the coffee grounds holding device thereby providing a fluid passageway into the coffee grounds holding device.

2. The portable coffee brewing device of claim 1, further comprising an electrical socket positioned in the portable coffee brewing device and connected to an external power source thereby powering the electrical components of the portable coffee brewing device.

3. The portable coffee brewing device of claim 1, wherein the drip tube is positioned within the sidewall of the container.

4. The portable coffee brewing device of claim 1, wherein the drip tube is removable for cleaning purposes.

5. The portable coffee brewing device of claim 1, wherein the drip tube is fluidly connected to the nipple by a passageway in the lid.

6. The portable coffee brewing device of claim 1, wherein the lid is connected to the container by a hinge, wherein the lid pivots between the open position and the closed position on the hinge.

7. The portable coffee brewing device of claim 1, further comprising a drain positioned in the bottom wall of the container, the drain having a one way valve.

8. A portable coffee brewing device, comprising:
a container;
the container having a sidewall extending between an upper end and a lower end;
a bottom wall connected to the lower end of the sidewall;
a lid pivotally connected adjacent the upper end of the sidewall by a hinge;
the lid configured to move between an open position and a closed position;
a nipple operatively connected to the lid;
a holder positioned between the container and the lid;
the holder having an opening therein that is sized and shaped to receive a coffee grounds holding device therein;
wherein the coffee grounds holding device includes a container that forms a hollow interior, an amount of coffee grounds held within the hollow interior of the coffee grounds holding device, and a cover that covers the hollow interior of the coffee grounds holding device;
a housing connected to the container;
a heating element positioned within the housing;
a drip tube fluidly connected to the heating element and the lid;
wherein when the container is filled with fluid and the heating element is activated, heated fluid is forced up the drip tube, through the lid and into the coffee grounds holding device;
wherein when a coffee grounds holding device is positioned within the holder and the lid is moved from an open position to a closed position, the nipple penetrates the cover of the coffee grounds holding device thereby providing a fluid passageway into the coffee grounds holding device.

9. The portable coffee brewing device of claim 8 further comprising electrical components positioned within the housing.

10. The portable coffee brewing device of claim 8 further an electrical socket positioned in portable coffee brewing device and connected to an external power source thereby powering electrical components of the portable coffee brewing device.

11. The portable coffee brewing device of claim 8 wherein the drip tube is positioned within the sidewall of the container.

12. The portable coffee brewing device of claim 8 wherein the drip tube is removable for cleaning purposes.

13. The portable coffee brewing device of claim 8 wherein the drip tube is fluidly connected to the nipple.

14. The portable coffee brewing device of claim 8 further comprising a drain positioned in the bottom wall of the container, the drain having a one way valve.

15. A portable coffee brewing device, comprising:
a container;
the container having a sidewall extending between an upper end and a lower end;
a bottom wall connected adjacent the lower end of the sidewall;
wherein the container defines a hollow interior;
a lid pivotally connected adjacent the upper end of the container;
the lid configured to move between an open position and a closed position;
a coffee grounds holding device positioned below the lid;
wherein the coffee grounds holding device includes a container that forms a hollow interior, an amount of coffee grounds held within the hollow interior of the coffee grounds holding device, and a cover that covers the hollow interior of the coffee grounds holding device;
the lid having a passageway therein;
a nipple fluidly connected to the passageway in the lid;
a drip tube;
wherein when the lid is moved from an open position to a closed position, the nipple penetrates the cover of the coffee grounds holding device thereby providing a fluid path from the drip tube through the passageway and into the coffee grounds holding device; and
wherein when activated, the drip tube transports fluid to the passageway in the lid and the passageway in the lid transports fluid to the coffee grounds holding device.

16. The portable coffee brewing device of claim 15 further comprising a button that operatively connects to the container and the lid, such that activating the button when the lid is in a closed position releases the lid to an open position.

17. The portable coffee brewing device of claim 15 further comprising a pour spout positioned in the lid that fluidly connects to the hollow interior of the container.

18. The portable coffee brewing device of claim 15 further comprising a pour spout positioned in the lid, wherein the pour spout is opened and closed by a slidable cover.

19. The portable coffee brewing device of claim 15 wherein the coffee grounds holding device has an opening therein that is sized and shaped to receive a single serve coffee grounds container.

20. The portable coffee brewing device of claim 15 further comprising a heating element, wherein when the container is filled with fluid and the heating element is activated, heated fluid is forced up the drip tube, through the lid and into a single serve coffee grounds container held by the coffee grounds holding device.

\* \* \* \* \*